US006756882B2

(12) United States Patent
Benes et al.

(10) Patent No.: US 6,756,882 B2
(45) Date of Patent: Jun. 29, 2004

(54) METHOD AND CONTROLLER FOR PROVIDING A LOCATION-BASED GAME ASSOCIATED WITH A PLURALITY OF MOBILE STATIONS

(75) Inventors: Stanley J. Benes, Round Lake Beach, IL (US); Lawrence Downing, Hoffmann Estates, IL (US); Gerald J. Gutowski, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 111 days.

(21) Appl. No.: 10/237,573

(22) Filed: Sep. 9, 2002

(65) Prior Publication Data

US 2004/0046655 A1 Mar. 11, 2004

(51) Int. Cl.$^7$ ................................................ G08B 23/00
(52) U.S. Cl. .......................... 340/323 R; 340/286.02; 340/539.13; 273/454; 273/459
(58) Field of Search .................. 340/323 R, 286.02, 340/568.7, 995.27, 995.28, 7.48, 539.11, 539.13; 273/454, 457, 459, 460

(56) References Cited

U.S. PATENT DOCUMENTS 4,961,575 A * 10/1990 Perry ...................... 340/323 R
5,204,657 A * 4/1993 Prosser et al. ............ 340/568.7
5,686,887 A * 11/1997 Chen et al. ............. 340/539.19
5,942,969 A   8/1999 Wicks
5,999,808 A  12/1999 LaDue
6,320,495 B1 11/2001 Sporgis

* cited by examiner

Primary Examiner—Van Trieu
(74) Attorney, Agent, or Firm—Marshall, Gerstein & Borun LLP

(57) ABSTRACT

A method (400) and a controller (210) for providing a location-based game associated with a plurality of mobile stations (170) are described herein. The controller (210) may determine a plurality of game parameters based on user input from one of a plurality of players. The plurality of game parameters may include, but is not limited to, a game area (500) having a plurality of activation locations (505). The controller (210) may determine location associated with at least one of the plurality of mobile stations (164). In response to one of the plurality of mobile stations (164) being within a proximity threshold (535) associated with one of the plurality of activation locations (530), the controller (210) may activate a game feature within one of the plurality of mobile stations (164). Accordingly, the controller (210) may provide a point value to one of the plurality of players in response to a trigger event associated with the game feature.

22 Claims, 5 Drawing Sheets

METHOD AND CONTROLLER FOR PROVIDING A LOCATION-BASED GAME ASSOCIATED WITH A PLURALITY OF MOBILE STATIONS

TECHNICAL FIELD

The present disclosure relates to wireless communication systems, and more particularly, to a method and a controller for providing a location-based game associated with a plurality of mobile stations.

BACKGROUND AND SUMMARY OF THE INVENTION

Wireless communication service providers offer many location-based services such as emergency services, mobile yellow pages, and navigation assistance to subscribers. In fact, some providers may provide entertainment services such as games based on location of subscribers. Typically, a provider may automatically provide a location-based game without allowing the subscribers to alter the game rules and parameters. That is, current location-based games do not permit subscribers to alter the game by defining a desired area of play nor do they activate game features without direct communication between the subscriber and the provider. For example, a subscriber may be physically at a particular location but the subscriber may need to call in to the provider to activate a game feature associated with the location-based game. As a result, subscribers may be forced to use premium airtime to participate in the game.

Further, one aspect of designing a wireless communication system is to optimize the resources available to subscribers. In particular, one method of improving the availability of resources within the wireless communication system is to reduce traffic to and from mobile stations. Therefore, a need exists for a player-defined location-based game and an effective means to provide that game.

BRIEF DESCRIPTION OF THE DRAWINGS

This disclosure will describe several embodiments to illustrate its broad teachings. Reference is also made to the attached drawings.

DETAILED DESCRIPTION

Figure 1:
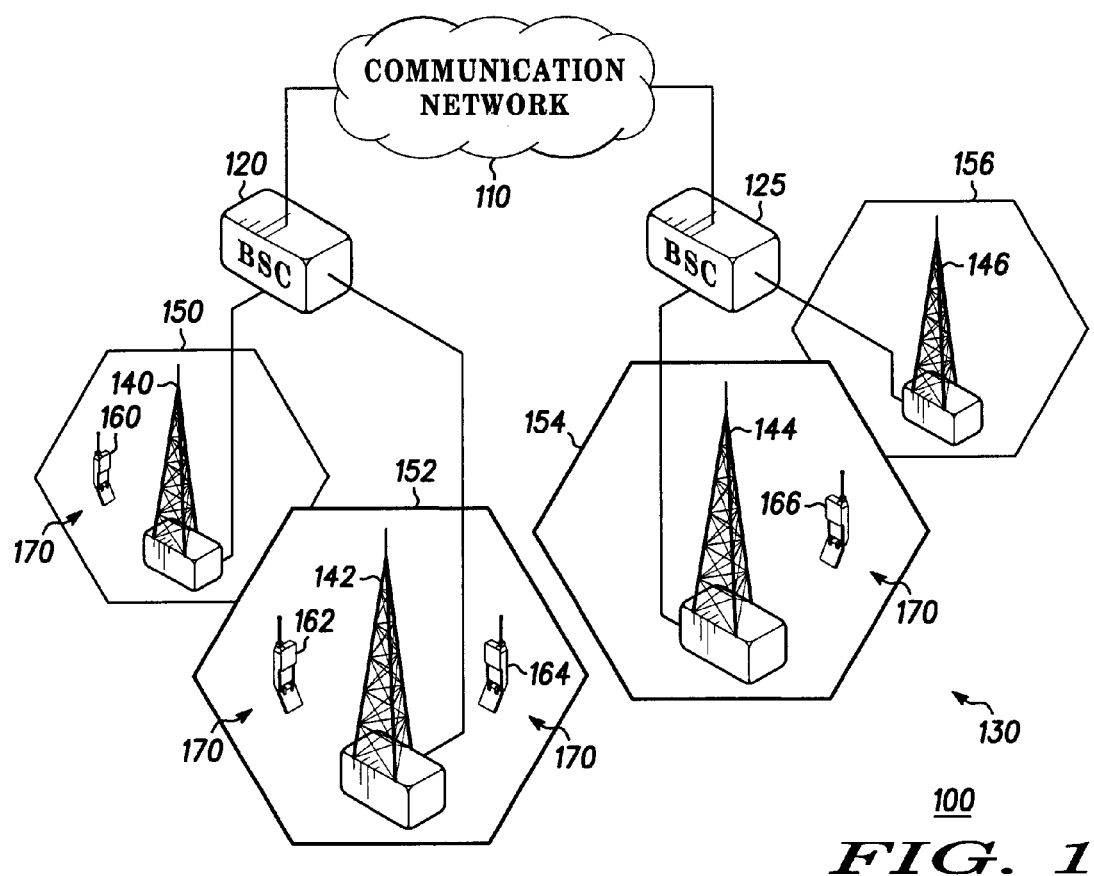
FIG. 1 is a block diagram representation of a wireless communication system.

A method and a controller for providing a location-based game associated with a plurality of mobile stations are described herein. In a wireless communication system, each of a plurality of mobile stations may correspond to one of a plurality of players of the location-based game. The controller may determine a plurality of game parameters based on user input within one of the plurality of mobile stations. In particular, the controller may be integrated into a communication network that provides communication service to the plurality of mobile stations. Alternatively, the location-based game may be mobile station-centric such that the controller may be integrated into at least one of the plurality of mobile stations. For example, one of the plurality of mobile stations may act as a host mobile station. The plurality of game parameters may include, but is not limited to, a game area having a plurality of activation locations, a time period associated with the location-based game, and an end condition associated with the location-based game. The controller may also determine location associated with one of the plurality of mobile stations. In response to one of the plurality of mobile stations being within a proximity threshold associated with one of the plurality of activation locations, the controller may activate a game feature within one of the plurality of mobile stations. For example, the controller may generate a game question within a mobile station in response to that particular mobile station being within the proximity threshold of one of the plurality of activation locations. Further, the controller may provide a point value to one of the plurality of players in response to a trigger event associated with the game feature. The trigger event may be, but is not limited to, a diffusing event and a detonating event. For example, a player may be awarded with points if that player responds correctly to the game question. However, if that player fails to respond correctly to the game question then another player may be awarded with points. Although the embodiments disclosed herein are particularly well suited for use with a cellular telephone such as one operable in accordance with Java 2 platform, Micro Edition (J2ME), persons of ordinary skill in the art will readily appreciate that the teachings of this disclosure are in no way limited to cellular telephones. On the contrary, persons of ordinary skill in the art will readily appreciate that the teachings of this disclosure can be employed with any wireless communication device such as a pager and a personal digital assistant (PDA).

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, CDMA 2000, the Personal Communications System (PCS), 3G, the Universal Mobile Telecommunications System (UMTS) and variations and evolutions of these protocols.

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

Referring to FIG. 1, a wireless communication system 100 includes a communication network 110 and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to a plurality of mobile stations (MS) 170, generally shown as 160, 162, 164, and 166, operating in communication cells 150, 152, 154, and 156, and each of these elements are commercially available from Motorola, Inc. of Schaumburg, Ill.

Figure 2:
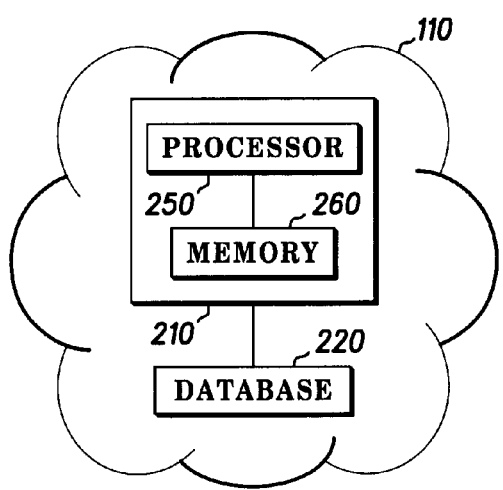
FIGS. 2 and 3 are block diagram representations of a controller.
Figure 3:
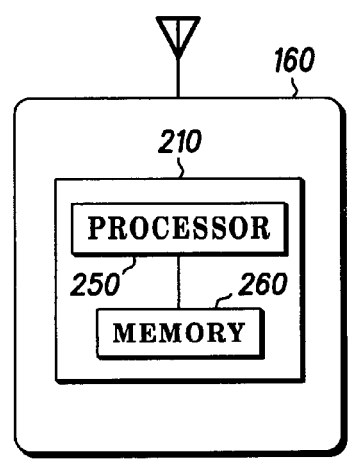

Referring to FIGS. 2 and 3, a controller 210 adapted to provide a location-based game is shown. As used herein "game" refers to any form of amusement, recreation, competition or contest. Further, "game" also refers to any simulated activity, virtual activity, role-playing activity, competitive activity involving skill, chance and/or endurance, or activity requiring a number of points for winning. The controller 210 may be operatively coupled to a database 220 and integrated into the communication network 110 as shown in FIG. 2. The controller 210 may operate as a central server from the communication network 110 to provide the location-based game as described herein. Alternatively, the location-based game may be mobile station-centric such that the controller 210 may be integrated into at least one of the plurality of mobile stations 170 (one shown as 160 in FIG. 3). That is, one of the plurality of mobile stations 170 may act as a host mobile station or all of plurality of mobile stations 170 may act in conjunction with each other to operate the location-based game as described herein. The controller 210 includes a processor 250 and a memory 260. The processor 250 is operatively coupled to the memory 260, which stores a program or a set of operating instructions for the processor 250. The processor 250 executes the program or the set of operating instructions such that the controller 210 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The database 220 may be operable to store information associated with the location-based game such as, but not limited to, a plurality of game parameters, a plurality of timers, and game records.

Figure 4:
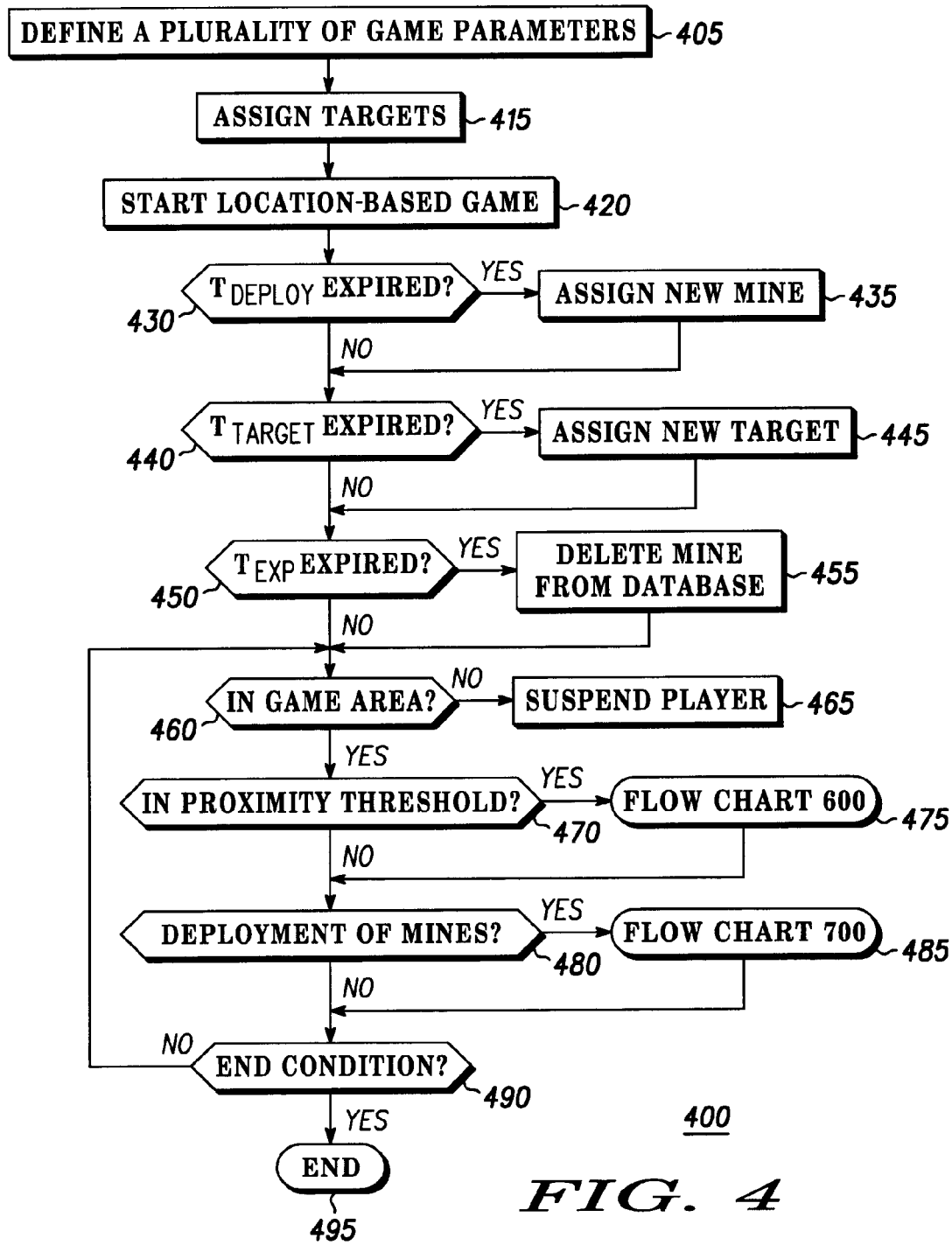
FIG. 4 is a visual representation of a location-based game.

One possible implementation of the computer program executed by the controller 210 (e.g., via the processor 250) is illustrated in FIG. 4. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 4, persons of ordinary skill in the art will appreciate that these steps can be performed in other temporal sequences. Again, the flow chart 400 is merely provided as an example of one way to program the controller 210 to provide a location-based game associated with a plurality of mobile stations 170. The flow chart 400 begins at step 405, wherein the controller 210 may define a plurality of game parameters based on user input from one of a plurality of players of the location-based game. The plurality of game parameters may be, but is not limited to, a game area, a time period, an end condition, a category of game questions, and a proximity threshold associated with one of a plurality of activation locations within the game area. Each of the plurality of players may operate one of the plurality of mobile stations 170. For example, a player operating the mobile station 160 may define a game area within the total service area 130 shown in FIG. 1 for the location-based game.

Figure 5:
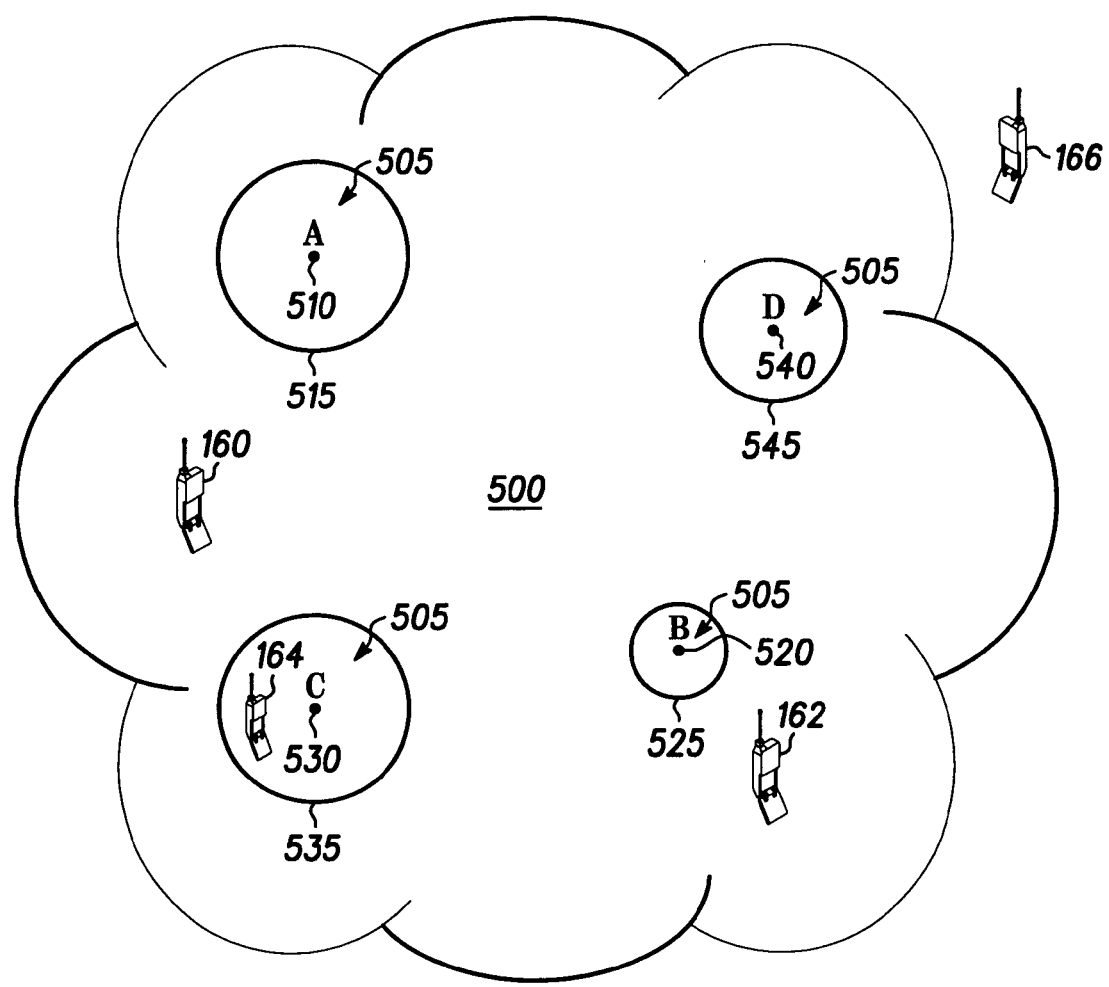
FIGS. 5, 6, and 7 are flow diagrams illustrating a method for providing a location based game.

Referring to FIG. 5, the game area 500 may be a geographic region defined by, but not limited to, user input (i.e., inputting latitude and longitude coordinates via a mobile station) and survey (i.e., physically being at a location) of the boundaries. When a player (e.g., one of the users of the mobile stations 160, 162, 164) is within the game area 500, a game feature associated with the location-based game may be automatically activated (i.e., without user input). In contrast, when a player (e.g., user of the mobile station 166) is outside of the game area 500, the player may be suspended from participating in the location-based game. The game area 500 may include a plurality of activation locations 505, generally shown as Location A 510, Location B 520, Location C 530, and Location D 540, so that the game feature may be activated when a player is within a proximity threshold (generally shown as 515, 525, 535, 545) of one of the plurality of activation locations 505 as described in detail below. The plurality of activation locations 505 may be defined as a latitude/longitude coordinate by a location system such as, but not limited to, a global positioning system (GPS), and a forward link trilateration (FLT) system. Other examples of an activation location may be a location associated with, but not limited to, an area code, a zip code, and a square block.

A player of the location-based game (e.g., the user of the mobile station 160) may also define the game feature associated with the location-based game. For example, the game feature may be, but is not limited to, generating a game question when a player is within a proximity threshold of one of the plurality of activation locations 505. In particular, the game questions may be associated with a category such as, but not limited to, sports, science, history, arts, entertainment, people, and places. The response by a player to the game questions may determine how to assign point values to the players in the location-based game as described in detail below.

Further, a player such as, but not limited to, the player operating the mobile station 160, may define an end condition associated with the location-based game. For example, the location-based game may end for all players after a game time period ($T_{GAME}$). The game time period ($T_{GAME}$) may be, but is not limited to, a user-defined time period and a randomly-generated time period. In another example, the location-based game may have a single elimination format such that a player may exit the location-based game after a detonating event (i.e., a player may detonate a "mine" by failing to respond correctly to a game question). A player may also exit the location-based game after detonating a predetermined number of mines (i.e., failing to respond correctly to a predetermined number of game questions). Alternatively, the location-based game may end when a player scores a predetermined number of points (i.e., reaches a predetermined point value). For example, the location-based game may end when a player scores a particular number of points. A player's participation in the location-based game may be terminated when the score of that player falls below a minimum threshold such as zero (0) points.

Upon defining the plurality of game parameters as described above, the controller 210 at step 415 may assign each player participating in the location-based game with another player as a target. The controller 210 may either assign targets based on user input or randomly assign each player to at least one target. For example, the player operating the mobile station 162 may be a target for the player operating the mobile station 164, which in turn, may be a target for the player operating the mobile station 166 (i.e., MS 162→MS 164→MS 166). Alternatively, the controller 210 may assign targets on a reciprocal basis as oppose to a non-reciprocal basis as described above. That is, the player operating the mobile station 162 may be a target for the player operating the mobile station 164 and vice versa (i.e., MS 162⇆MS 164). A player may be a target of a mine setter (i.e., another player) for a time period ($T_{TARGET}$) or until that detonates a mine set by the mine setter (i.e., failing to respond correctly to a game question). The assignment of targets may contribute to providing point values to the players in the location-based game as described in detail below.

The location-based game may start at step 420. In particular, a plurality of time periods associated with, but not limited to, the game, a target, and an activation location may begin to increment/decrement. For example, a player may have defined the location-based game to end in eight (8) hours (i.e., an end condition). As result, the players may play the location-based game until the game time period increments/decrements to eight (8) hours.

The controller 210 may also keep track of a deployment time period ($T_{DEPLOY}$), which is a time period for a player to activate a plurality of activation locations 505 ("mines"). That is, a player may activate a predetermined number of locations within the game area 500 as one of the plurality of activation locations 505 such that a game feature may be activated when another player is within a proximity threshold of one of the plurality of activation locations 505. The plurality of activation locations 505 (i.e., location of the mines) may be stored within the database 220. As mines are deployed, for example, the number of mines available for a player to deploy may decrease. To prevent "flooding" of the game space 500 with mines all at once, the controller 210 at step 430 may determine whether the deployment time period ($T_{DEPLOY}$) has expired before assigning additional mines for a player to deploy. In which case, the controller 210 may assign additional mines to a player at step 435. Otherwise, the controller 210 may proceed directly to step 440 to determine whether a target time period ($T_{TARGET}$) has expired, i.e., a time period associated with a player being a target. If the target time period ($T_{TARGET}$) has expired then the controller 210 at step 445 may assign that player as a new target for another player. Following the example described above, the player operating the mobile station 162 may be a target of the player operating the mobile station 164. When the target time period ($T_{TARGET}$) associated with the player operating the mobile station 162 expires, the controller 210 may assign the player operating the mobile station 164 with another player as a target. Next, the controller 210 may proceed to step 450 to determine whether an expiration time period ($T_{EXPIRATION}$) of one of the plurality of activation locations 505 has expired. That is, a location within the game area may be activated as an activation location (i.e., a "mine") for a particular time period. After the expiration time period ($T_{EXPIRATION}$), a location may no longer be activated so that a game feature may be triggered when a player is within a proximity threshold of that particular location. Accordingly, the controller 210 at step 455 may delete that particular location from the database 220 as one of the plurality of activation locations 505 (i.e., no longer a "mine").

The controller 210 may monitor and determine location associated with at least one of the plurality of mobile stations 170. Persons of ordinary skill in the art will appreciate that determining location of a mobile station may be implemented in many ways. For example, the controller 210 may determine location associated with the mobile station 160 based on a global positioning system (GPS). Based on the location of a mobile station, the controller 210 at step 460 may determine whether that particular mobile station is within the game area 500. If the mobile station is outside of the game area 500 (e.g., mobile station 166), the controller at step 465 may suspend the player operating that mobile station from participating in the location-based game. For example, the player operating the mobile station 166 may not participate in the location-based game because the mobile station 166 is outside the game area 500 as shown in FIG. 5. Otherwise, referring back to FIG. 4, the controller 210 at step 470 may determine whether the mobile station is within a proximity threshold of one of the plurality of activation locations 505. Each proximity threshold, generally shown as 515, 525, 535, 545, may be a surrounding area that defines the boundary of a corresponding activation location 510, 520, 530, 540, respectively. For example, the proximity threshold 525 of Location B 520 may be 100 feet (i.e., less than or equal to 100 feet), and the mobile station 162 may be more than 100 feet from Location B 520 (i.e., >100 feet). Because the mobile station 162 is outside the proximity threshold 525 of Location B 520, the mobile station 162 may not activate a game feature associated with the location-based game. In contrast, for example, the proximity threshold 535 of Location C 530 may be 200 feet (i.e., less than or equal to 200 feet), and the mobile station 164 may be less than 200 feet from Location C 530. As a result, the mobile station 164 may activate a game feature associated with the location-based game because the mobile station 164 is within the proximity threshold 535 of the Location C 530.

Each of the proximity thresholds 515, 525, 535, 535 may be user-defined by a player who designated a corresponding location as one of the plurality of activation locations 505 (i.e., the mine setter may set the proximity threshold of a "mine"). Point values may be awarded based on the proximity threshold. That is, a smaller proximity threshold may correspond to more points for the mine setter whereas a larger threshold may correspond to fewer points for the mine setter in response to a mine being detonated. For example, the miner setter of Location B 520 may receive more points than the mine setter of Location C 530 because the proximity threshold 525 for Location B 520 is less than the proximity threshold 535 for Location C (i.e., 100 feet versus 200 feet, respectively, as mentioned in the above example).

Figure 6:
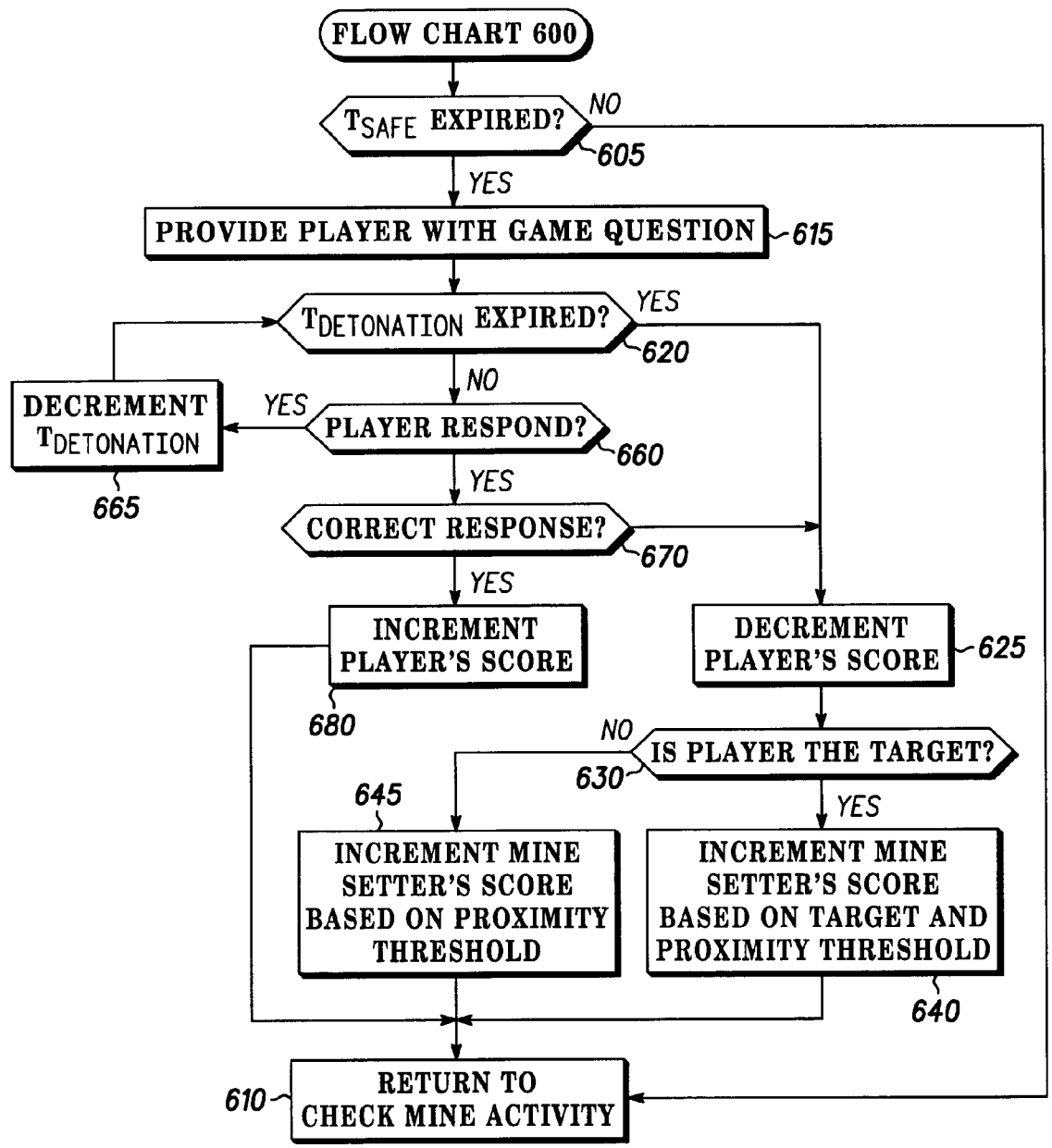

By being in within the proximity threshold of one of the plurality of activation locations 505 (i.e., triggering a mine) as the mobile station 164 did in the above example, the player operating the mobile station 164 may be provided with a notification indicating that a game feature may be activated (i.e., a game question). The notification may be, but is not limited to, a graphical image, a sound indication, a visual indication, a text message, an audio message, a video message, and a multimedia message. Accordingly, the controller 210 at step 475 may proceed to flow chart 600 shown in FIG. 6. In particular, the controller 210 at step 605 may determine whether a safe time period ($T_{SAFE}$) associated with one of the plurality of activation locations has expired, i.e., a time period for a player to designate a location as one of the plurality of activation locations and to leave the proximity threshold of that activation location before it may be armed. Thus, the safe time period ($T_{SAFE}$) may allow a player to "back track" to designate another location as one of the plurality of activation locations. The controller 210 may return to flow chart 400 via step 610 if the safe time period ($T_{SAFE}$) has not expired. Otherwise, the controller 210 may remove that activation location from the database 220 and proceed to step 615 to provide a player with a game question. The controller 210 may randomly select the game question for the player to respond. Alternatively, the player may select a game question within a category. Points may be awarded to the players based on whether a mine diffused. In particular, a player may diffuse a mine by responding correctly to a game question within a detonation time period ($T_{DETONATION}$). At steps 620, the controller 210 may determine whether the detonation time period ($T_{DETONATION}$) has expired. If the player fails to respond correctly the game questions prior to the detonation time period ($T_{DETONATION}$) expiring, the controller 210 may to provide point values to the players accordingly. To illustrate the concept of providing point values, the controller 210 at step 625 may begin providing point values to the players by decrementing the score of the player who failed to respond to the game question prior to the detonation time period ($T_{DETONATION}$). Further, the controller 210 at step 630 may determine whether that player (i.e., one who activated the game feature by being within the proximity threshold of one of the plurality of activation locations 505) is a target of the player who designated the location as one of the plurality of activation locations 505. That is, the controller 210 may determine whether the player who triggered the mine is a target of the player who set the mine (i.e., the mine setter). For example, the player operating the mobile station 164 may have activated a game feature by being within the proximity threshold 535 of location C 530. Accordingly, the controller 210 may determine whether the player operating the mobile station 164 may be a target of the player who designated Location C 530 as one of the plurality of activation locations 505 (i.e., the player who deployed the mine at Location C). If the player operating the mobile station 164 is a target of the mine setter, the controller 210 at step 640 may increment the score the mine setter accordingly. That is, the mine setter may receive more points because a target failed to provide a correct response to the game question within the detonation time period ($T_{DETONATION}$) (i.e., the target detonated the mine). Further, the controller 210 may also award points based on the proximity threshold. As noted above, a smaller proximity threshold may correspond to more points for the mine setter whereas a larger proximity threshold may correspond to fewer points because a smaller proximity threshold is not as encompassing as a larger proximity threshold (i.e., a smaller proximity threshold covers a smaller area than a larger proximity threshold). On the other hand, if the player operating the mobile station 164 is not a target of the mine setter, the controller 210 at step 645 may increment the score of the mine setter simply based on the proximity threshold. After providing point values to the players at either step 640 or step 645, the controller 210 at step 610 may return to step 480 of flow chart 400 shown in FIG. 4.

Referring back to step 620, if the controller 210 determines that the detonation time period ($T_{DETONATION}$) has not expired then the controller 210 may proceed to step 660 to determine whether the player provided a response to the game question. If the player has not responded to the questions then the controller 210 at step 665 may decrement the detonation time period ($T_{DETONATION}$) and return to step 620 to determine whether the detonation time period ($T_{DETONATION}$) has expired. Otherwise, the controller 210 may proceed to step 670 to determine whether the player provided a correct response to the game question to diffuse the mine. If the player fails to respond correctly to the game questions (i.e., the mine detonated), the controller 210 may proceed to provide point values to the players beginning with step 625 as described above. However, if the player correctly answers to the game question then the controller 210 at step 680 may increment the score of that player. From the example illustrated above, if the player operating the mobile station 164 correctly responds to the game question then the player operating the mobile station 164 may be awarded with points. The controller 210 may also return to step 480 of flow chart 400 shown in FIG. 4 at step 650 after providing point values to the players at step 680.

Figure 7:
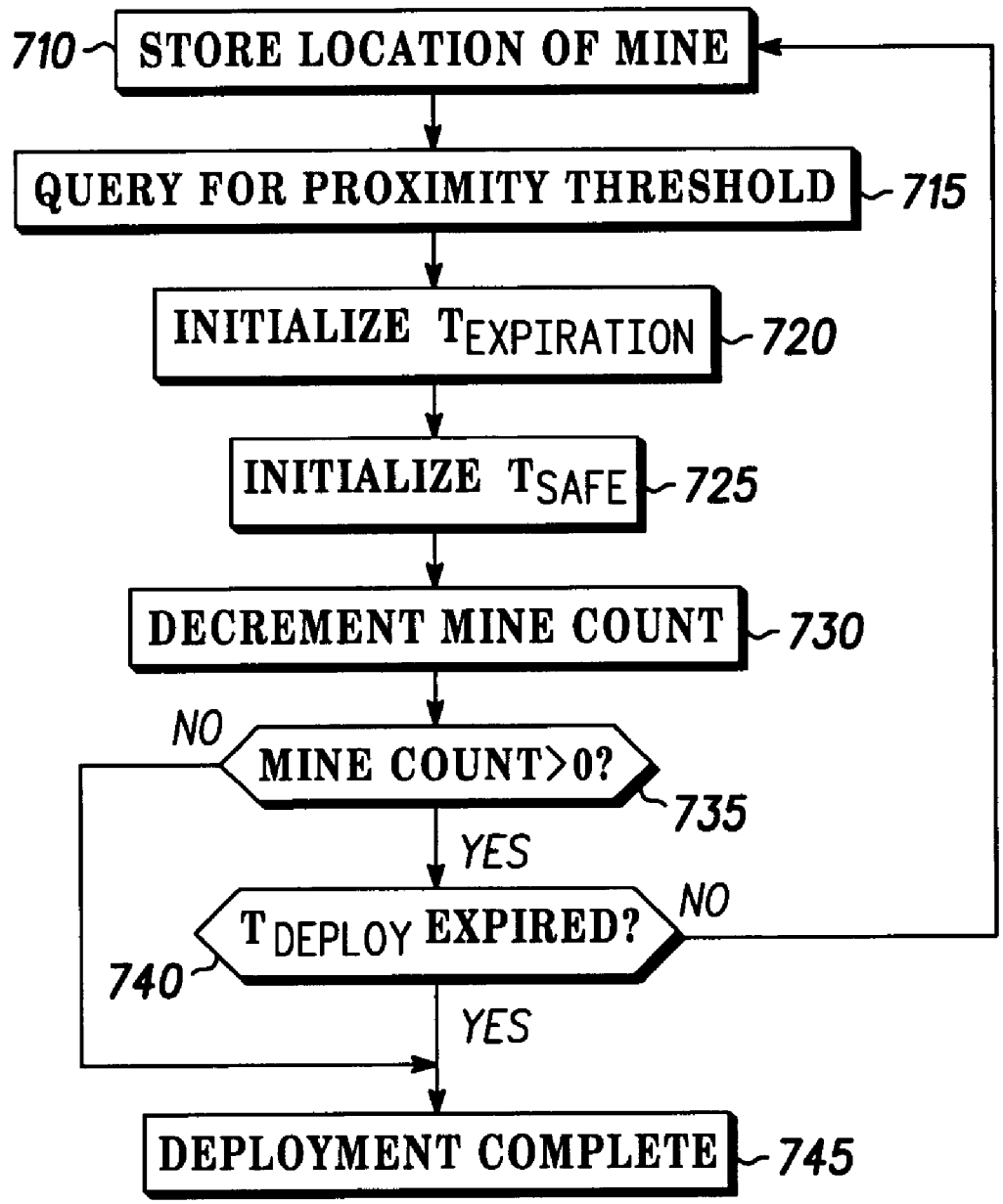

At step 480 of FIG. 4, the controller 210 may determine whether a player is designating a location as one of the plurality of activation locations 505 stored within the database 220. That is, the controller 210 may determine whether a player is deploying a mine. If a player is deploying mines, the controller 210 may proceed to the flow chart 700 shown in FIG. 7. In particular, each player may designate a predetermined number of locations as activation locations 505 (i.e., deploying a mine). Similar to defining the game area, a player may designate a location as one of the plurality of activation locations 505 via user input (i.e., inputting latitude and longitude coordinates via a mobile station) or physically survey (i.e., physically going to the location) of the location. Accordingly, the controller 210 at step 710 may store that location as one of the plurality of activation locations 505 stored within the database 220. At step 715, the controller 210 may query for a proximity threshold because a player may also set a proximity threshold corresponding to each of the activation locations 505 designated by that player. The proximity threshold may determine how close a player may be to a corresponding activation location to activate a game feature (i.e., how close to activate a mine). Further, point values may be based on the proximity threshold as described in detail above. Each of the plurality of activation locations 505 may have an expiration time period ($T_{EXPIRATION}$) such that the activation location may no longer be a part of the location-based game if the activation location is not activated before the expiration time period ($T_{EXPIRATION}$) (i.e., the mine may "self-destruct"). Also, the player may have the safe time period ($T_{SAFE}$) to designate and leave the proximity threshold of an activation location before it may be armed. Accordingly, the expiration time period ($T_{EXPIRATION}$) and the safe time period ($T_{SAFE}$) may be initialized at steps 720 and 725. As each mine is deployed, the number of mines available for the player to deploy may decrement by one (1) at step 730. That is, a mine count may begin with the predetermined number of mines available of the player to deploy, and the controller 210 may subtract one from the mine count each time a mine deployed. If the player has no more mines to deploy (i.e., meet the predetermined number of mines), the player may be notified at step 745 that the deployment of mines is completed. In contrast, if the mine count is greater than zero (0), then the controller 210 at step 740 may determine whether the deployment time period ($T_{DEPLOY}$) has expired. The player may continue to deploy mines until the deployment time period ($T_{DEPLOY}$) expires. Otherwise, the player may be notified that the deployment of mines is completed at step 745. Accordingly, the controller 210 may return to step 490 shown in FIG. 4.

In particular at step 490, the controller 210 may determine whether an end condition associated with the location-based game has occurred. As noted above, the end condition may be user-defined as one of the plurality of game parameters at step 405. For example, the location-based game may last for the game time period ($T_{GAME}$) as described above. When the game time period ($T_{GAME}$) expires, the controller 210 at step 495 may end the location-based game. In another example, the location-based game may end when a player scores a particular point value. That is, the location-based game may end when a player scores a particular number of points. Alternatively, a player's participation in the location-based game may be terminated when the score of that player falls below a minimum threshold such as zero (0) points. The location-based game may also be in a single-elimination format such that a player may no longer participate in the game if that player fails to respond correctly to a game question (i.e., fails to diffuse a mine). Otherwise, the controller 210 may return to step 460 to repeat the process as described in detail above.

As noted above, the controller 210 may be integrated into at last one of the plurality of mobile stations 170 so that either one of the plurality of mobile stations 170 may act as a host mobile station or all of the plurality of mobile stations 170 may act in conjunction with each other to operate the location-based game. Accordingly, the information associated with the location-based game from the database 220 may be downloaded to at least one of the plurality of mobile stations 170 (i.e., to the memory 260 shown in FIG. 3) so that the controller 210 may operate as described above. For example, each of the plurality of mobile stations 170 (i.e., via the controller 210) may determine its own location. Further, each of the plurality of mobile stations 170 may receive updates of the plurality of activation locations 505 (e.g., one shown as 510 in FIG. 5) so that the mobile station may determine whether it is within a proximity threshold 515 of one of the plurality of activation locations 505 stored in the database 220.

Although the location-based game disclosed herein is particularly well suited for entertainment, persons of ordinary skill in the art will readily appreciate that the teachings herein are in no way limited to such use. On the contrary, persons of ordinary skill in the art will readily appreciate that the teachings of this disclosure can be employed for other purposes within a wireless communication system.

Many changes and modifications to the embodiments described herein could be made. The scope of some changes is discussed above. The scope of others will become apparent from the appended claims.

What is claimed is:

1. In a wireless communication system, wherein each of a plurality of mobile stations corresponds to one of a plurality of players of a location-based game, a method for providing the location-based game, the method comprising:

determining a plurality of game parameters based on user input from one of the plurality of players, the plurality of game parameters including a game area having a plurality of activation locations;

determining location associated with at least one of the plurality of mobile stations;

activating a game feature within one of the plurality of mobile stations in response to the at least one of the plurality of mobile stations being within a proximity threshold associated with one of the plurality of activation locations; and providing a point value to one of the plurality of players in response to a trigger event associated with the game feature.

2. The method of claim 1, wherein the step of determining a plurality of game parameters based on user input within one of the plurality of mobile stations comprises determining one of a time period associated with the location-based game, a time period associated with a game feature, an end condition associated with the location-based game, a category of game questions, and the proximity threshold associated with one of the plurality of activation locations.

3. The method of claim 1, wherein the step of determining location associated with a plurality of mobile stations comprises determining location associated with a plurality of mobile stations based on one of a global positioning system (GPS) and a forward link trilateration (FLT) system.

4. The method of claim 1, wherein the step of activating a game feature within one of the plurality of mobile stations in response to the one of the plurality of mobile stations being within a proximity threshold of one of the plurality of activation locations comprises generating a game question for a time period within one of the plurality of mobile stations in response to the at least one of the plurality of mobile stations being within a proximity threshold of one of the plurality of activation locations.

5. The method of claim 1, wherein the step of providing a point value to one of the plurality of players in response to a trigger event associated with the game feature comprises providing a point value in response to one of a detonating event and a diffusing event, the detonating event being a player responding incorrectly to a game question, and the diffusing event being a player responding correctly to the game question.

6. The method of claim 1, wherein the step of providing a point value to one of the plurality of players in response to a trigger event associated with the game feature comprises providing a point value to a first player in response to a second player failing to respond to a game question within a time period.

7. The method of claim 1, wherein the step of providing a point value to one of the plurality of players in response to a trigger event associated with the game feature comprises providing a positive point value to a first player and providing a negative point value to a second player in response to the second player responding incorrectly to a game question.

8. In a wireless communication system, wherein each of a plurality of mobile stations corresponds to a player of a location-based game, a controller for providing the location based game, the controller comprising:

a memory;

a processor operatively coupled to the memory, the processor being programmed to determine a plurality of game parameters based on user input within one of the plurality of mobile stations, the plurality of game parameters including a game area having a plurality of activation locations, the processor being programmed to determine location associated with at least one of the plurality of mobile stations, the processor being programmed to activate a game feature within one of the plurality of mobile stations in response to the at least one of the plurality of mobile stations being within a proximity threshold associated with one of the plurality of activation locations, and the processor being programmed to provide a point value to one of the plurality of players in response to a trigger event associated with the game feature.

9. The controller of claim 8, wherein the plurality of game parameters is one of a time period associated with the location-based game, a time period associated with a game feature, an end condition associated with the location-based game, a category of game questions, and the proximity threshold associated with one of the plurality of activation locations.

10. The controller of claim 8, wherein the game feature is a generation of a game question within one of the plurality of mobile stations.

11. The controller of claim 8, wherein the trigger event is one of a detonating event and a diffusing event, the detonating event being a player responding incorrectly to a game question, and the diffusing event being a player responding correctly to the game question.

12. The controller of claim 8, wherein the trigger event is an expiration of a time period for responding to a game question.

13. The controller of claim 8, wherein the memory includes information associated with the location-based game from a database within a communication network, the information including information associated the plurality of activation locations.

14. The controller of claim 8 is integrated into one of at least one of the plurality of mobile stations and a communication network providing communication service to the plurality of mobile stations.

15. In a wireless communication system, wherein each of a plurality of mobile stations corresponds to one of a plurality of players of a location-based game, and wherein a processor operates in accordance with a computer program embodied on a computer-readable medium for providing a location based game, the computer program comprising:

a first routine that directs the processor to determine a plurality of game parameters based on user input within one of the plurality of mobile stations, the plurality of game parameters including a game area having a plurality of activation locations;

a second routine that directs the processor to determine location associated with at least one of the plurality of mobile stations;

a third routine that directs the processor to activate a game feature within one of the plurality of mobile stations in response to the at least one of the plurality of mobile stations being within a proximity threshold associated with one of the plurality of activation locations; and a fourth routine that directs the processor to provide a point value to one of the plurality of players in response to a trigger event associated with the game feature.

16. The computer program of claim 15, wherein the first routine comprises a routine that directs the processor to determine one of a time period associated with the location-based game, a time period associated with a game feature, an end condition associated with the location-based game, a category of game questions, and the proximity threshold associated with one of the plurality activation locations.

17. The computer program of claim 15, wherein the second routine comprises a routine that directs the processor to determine location associated with a plurality of mobile stations based on one of a global positioning system (GPS) and a forward link trilateration (FLT) system.

18. The computer program of claim 15, wherein the third routine comprises a routine that directs the processor to generate a game question for a time period within one of the plurality of mobile stations in response to the at least one of the plurality of mobile stations being within one of the plurality of activation locations.

19. The computer program of claim 15, wherein the fourth routine comprises a routine that directs the processor to provide a point value to one of the plurality of players in response to one of a detonating event and a diffusing event, the detonating event being a player responding incorrectly to a game question, and the diffusing event being a player responding correctly to the game question.

20. The computer program of claim 15, wherein the second routine comprises a routine that directs the processor to provide a point value to a first player in response to a second player failing to respond to a game question within a time period.

21. The computer program of claim 15, wherein the second routine comprises a routine that directs the processor to provide a positive point value to a first player and to provide a negative point value to a second player in response to the second player responding incorrectly to a game question.

22. The computer program of claim 15, wherein the medium is one of paper, a programmable gate array, application specific integrated circuit, erasable programmable read only memory, read only memory, random access memory, magnetic media, and optical media.

* * * * *

UNITED STATES PATENT AND TRADEMARK OFFICE
CERTIFICATE OF CORRECTION

PATENT NO. : 6,756,882 B2
DATED : June 29, 2004
INVENTOR(S) : Stanley J. Benes et al.

It is certified that error appears in the above-identified patent and that said Letters Patent is hereby corrected as shown below:

Title page,
Item [75], Inventors, please delete "Hoffmann Estates" and insert -- Hoffman Estates --.

Signed and Sealed this

Nineteenth Day of October, 2004

JON W. DUDAS
*Director of the United States Patent and Trademark Office*